Figure 1:
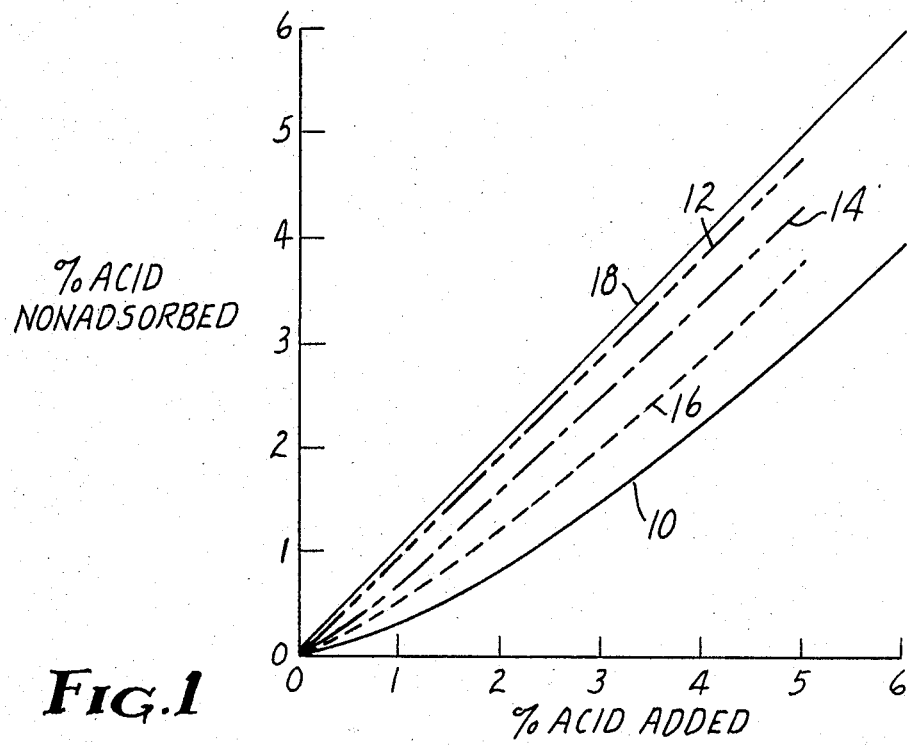

United States Patent [19]

Kuo et al.

[11] Patent Number: 4,693,930

[45] Date of Patent: Sep. 15, 1987

[54] SMOOTH, LOW-FRICTION MAGNETIC RECORDING MEDIUM

[75] Inventors: Richard J. Kuo, St. Paul; John W. Mackay, Afton; Rick L. Van Buren, Eagan, all of Minn.

[73] Assignee: Minnesota Mining and Manufacturing Company, St. Paul, Minn.

[21] Appl. No.: 730,272

[22] Filed: May 3, 1985

[51] Int. Cl.$^4$ .................. G11B 5/68; G11B 5/706; G11B 5/71

[52] U.S. Cl. .................... 428/323; 427/128; 428/694; 428/695; 428/900

[58] Field of Search .............. 428/694, 695, 900; 427/131, 128; 252/62.54

[56] References Cited

U.S. PATENT DOCUMENTS

| | | | |
|---|---|---|---|
| 3,470,021 | 9/1969 | Hendricx | 117/239 |
| 3,630,772 | 12/1971 | Seidel | 117/235 |
| 3,704,152 | 11/1972 | Hartmann et al. | 117/235 |
| 4,337,288 | 6/1982 | Takenaka et al. | 428/694 |
| 4,361,621 | 11/1982 | Isobe et al. | 428/694 |
| 4,395,466 | 7/1983 | Ogawa et al. | 428/695 |
| 4,436,786 | 3/1984 | Ohkawa et al. | 428/447 |
| 4,439,486 | 3/1984 | Yamada et al. | 428/332 |
| 4,448,842 | 5/1984 | Yamaguchi et al. | 428/695 |
| 4,465,737 | 8/1984 | Miyatuka et al. | 428/339 |
| 4,482,610 | 11/1984 | Ohita et al. | 428/694 |
| 4,522,885 | 6/1985 | Funahashi et al. | 428/695 |
| 4,537,833 | 8/1985 | Kasuga et al. | 428/694 |
| 4,550,054 | 10/1985 | Yamaguchi et al. | 428/695 |
| 4,592,942 | 6/1986 | Nishimatsu et al. | 428/695 |

OTHER PUBLICATIONS

Perry, D. M., "Three Dimensional Surface Metrology of Magnetic Recording Materials Through Direct Phase Detecting Microscopic Interferometry", Proceedings No. 59, Institution of Electronic and Radio Engineers, Apr. 2-5, 1984, Southampton, England.

*Primary Examiner*—Paul J. Thibodeau
*Attorney, Agent, or Firm*—Donald M. Sell; James A. Smith; Douglas B. Little

[57] ABSTRACT

Flexible magnetic recording media such as videotapes based on ferromagnetic oxide particles can provide high carrier-to-noise ratios previously available only with metal powder tapes when the recording layer has a high loading (at least 74% by weight) of oxide particles which have a high surface area (at least 40 m$^2$/g) and includes free monobasic fatty acid comprising more than 1.5% by weight of the ferromagnetic oxide particles. The free fatty acid provides a coefficient of friction not exceeding 0.3. A preferred monobasic fatty acid is myristic acid. By incorporating into the binder a lubricant-adsorption inhibitor such as citric acid, a greater proportion of the fatty acid remains free.

16 Claims, 2 Drawing Figures

SMOOTH, LOW-FRICTION MAGNETIC RECORDING MEDIUM

FIELD OF THE INVENTION

The invention concerns flexible magnetic recording media such as video recording tape, and is especially concerned with media which afford high carrier-to-noise ratios and also have excellent resistance to abrasion.

BACKGROUND ART

U.S. Pat. No. 3,470,021 (Hendricx et al.) says that in high speed recording on a magnetic recording medium (which may be flexible backing "friction causes lumps of redeposited debris of the magnetic recording layer to become attached to the surface of the recording material and/or to the heads" (col. 1, lines 28–31), but that good resistance to such lump formation is provided by incorporating oleic acid into the recording layer. It further says that the "carboxylic acid group of the oleic acid has a greater affinity to the magneticaly susceptible particles than for the binder . . . and consequently it is oriented towards the surface of those particles. The fatty or oleophilic part of the oleic acid, however, tends to turn away from the particles and in this way brings about an excellent lubrication, whereby the resistance of the magnetic recording material . . . to lump formation and abrasion is considerably improved" (col. 1, lines 60–72). The oleic acid is said to be useful in amounts ranging from 3 to 10 percent of the total weight of binder, magnetically susceptible particles, and oleic acid. In Example 1 of U.S. Pat. No. 3,630,772 (Seidel), the recording layer of a flexible magnetic recording medium includes 6.3% of oleic acid based on the weight of magnetically susceptible particles, namely needle-shaped gamma-iron oxide.

U.S. Pat. No. 4,436,786 (Ohkawa et al.) says that it has been conventional practice to employ various lubricants such as higher fatty acids or their derivatives (also naming other classes of materials as lubricants) but that "none of these lubricants can provide adequate lubricity to the magnetic tape" (col. 1, lines 39–46). It indicates that either silicone oils or higher fatty acids may exude onto the surface of the tape if used in large amounts, e.g., when the fatty acid is 6% by weight or more (col. 3, lines 2–15) "on the basis of a binder" (col. 3, line 43).

While the only magnetically susceptible particles mentioned in the Hendricx and Ohkawa patents are iron oxides, U.S. Pat. No. 4,465,737 (Miyatuka et al.) specifically concerns flexible magnetic recording media based on ferromagnetic metal powders that "are used to increase the magnetic recording density and output level and provide more saturation magnetization and coercivity" (col. 1, lines 18–22). It indicates that such a so-called "metal tape" is necessary for miniaturized videotape recorders that require higher C/N (carrier-to-noise) ratios than those of media based on oxide particles as in the previously cited patents. It indicates that to achieve higher recording density, the spacing loss (tape-head clearance) should be smaller, obtainable from a smoother tape surface, but that a smooth surface results in poor runability due to high contact resistance, making "the tape abrasive which causes problems in the durability of tapes" (col. 1, lines 49–61). The answer to this is "a magnetic layer containing a ferromagnetic metal powder having not less than 30 m$^2$/g of specific surface area, and a fatty acid and a fatty acid ester in an amount of 2 to 10 wt% based on the ferromagnetic metal powder, in which the amount of fatty acid ester is 15 to 60 wt% based on the total amount of the fatty acid and fatty acid ester, and having a surface roughness of not more than 0.03 micrometers" (col. 2, lines 24–31). Useful fatty acids include palmitic, stearic, myristic, lauric and oleic acids (col. 3, lines 53–57). Each of Examples 1–3 have the same binder which includes 2 parts of fatty acid (oleic plus palmitic) and 1-⅓ part of a fatty acid ester per 100 parts by weight of ferromagnetic powder. In the only use of more than 2 parts of fatty acid reported in the patent, (Comparative Example 4), a total of 2-⅔ parts of the same two fatty acids were used, based on 100 parts ferromagnetic powder, together with only ⅓ part of the same fatty acid ester (i.e., less than the 15% mentioned above). This produced head clogging.

U.S. Pat. No. 4,439,486 (Yamada et al.) concerns problems in flexible magnetic recording media from using fine ferromagnetic particles which, like those of the Miyatuka Patent, have a specific surface area of at least 30 m$^2$/g, but the only fine ferromagnetic particles mentioned in the Yamada patent are oxides, as opposed to Miyatuka's metal particles. As in the Miyatuka patent, the Yamada patent indicates that fine particles involve a problem of wear resistance. It addresses that problem by a modified binder. The binder "may contain optional additives such as a dispersant, lubricant ..." (paragraph bridging columns 4 and 5). "Suitable dispersants include aliphatic acids having 12 to 18 carbon atoms ... such as caprylic acid, capric acid, lauric acid, myristic acid, palmitic acid, stearic acid, oleic acid, elaidic acid, linolic acid, linolenic acid and stearoic acid" (col. 5, lines 3–18). "The dispersants mentioned above can also be used as a lubricant. Other suitable lubricants are silicone oils .." (col. 5, lines 19–21). The only specific binder composition employs 1 part of myristic acid and 0.5 part of butyl stearate per 100 parts by weight of ferromagnetic particles (col. 8. lines 16–17).

Japanese Patent Application JA58-31488 filed Feb. 25, 1983 (Miyata et al.) is concerned with improving both the magnetic properties and the durability of flexible magnetic recording media and indicates that this is achieved by incorporating a trialkoxy silane into certain binders. In Example 1, the recording layer comprises by weight 100 parts of cobalt-containing gamma-Fe$_2$O$_3$ particles, 5 parts of myristic acid, and 10 parts of n-butyl stearate, but nothing more is said about those materials or their utility. While the application names various ferromagnetic oxide and metal particles as being useful, it says nothing about their sizes or surface area.

Since the cost of ferromagnetic oxide particles is far less than that of ferromagnetic metal particles, it would be highly desirable to be able to use oxide particles to achieve objectives such as those of the Miyatuka patent, e.g., to obtain the high carrier-to-noise ratios required by miniaturized videotape recorders while also attaining the stable running properties and better durability to which that patent is directed. However, a high loading is required to achieve a high carrier-to-noise ratio and also the ultra-smooth surface that is needed to attain a high carrier-to-noise. Such ultra-smooth surfaces have resulted in high friction between the tape and head surfaces, resulting in poor runability and poor resistance to abrasion, problems faced in the Miyatuka patent when using fine ferromagnetic metal particles. Although fine ferromagnetic oxide particles have been available for some time, it is believed that the absence of a solution to those problems has deterred anyone from using such particles in magnetic recording tapes on a commercial basis.

DISCLOSURE OF INVENTION

The invention provides what is believed to be the first flexible magnetic recording medium which is based on ferromagnetic oxide particles and achieves carrier-to-noise ratios as high as those attainable with fine ferromagnetic metal particles. To achieve this requires (1) a high loading of fine ferromagnetic oxide particles (by "high loading" is meant that the ferromagnetic oxide particles comprise at least 74% by weight of total particles and binder, and by "fine" is meant particles having a surface area of at least 40 $m^2/g$), and (2) a very smooth surface, i.e., an RMS surface roughness not exceeding 9 nm as measured with computer-base microscopic interferometry (see Perry, D.M., et al, "Three Dimensional Surface Metrology of Magnetic Recording Materials Through Direct Phase Detecting Microscopic Interferometry", Proceedings No. 59, Institution of Electronic and Radio Engineers, Apr. 2–5, 1984, Southampton, England and Bruning, J.H., et al, "Digital Wavefront Measuring Interferometer for Testing Optical Surfaces and Lenses", *Applied Optics*, Nov., 1974).

Such surface smoothness requires superb lubrication as evidenced by a coefficient of friction ($\mu$) not exceeding 0.3 in the "Test for Coefficient of Friction" described below.

Included within the scope of this invention are recording media which have a concentration of ferromagnetic oxide particles less than 74 weight percent of the total of particles and binder.

Such low friction surprisingly is achieved in the present invention by a flexible medium that achieves such high carrier-to-noise ratios by including in its binder free monobasic fatty acid in an amount exceeding 1.5% by weight of the ferromagnetic oxide particles, which fatty acid has a straight chain of at least 12 carbon atoms. Fatty acids having 12 to 30 carbon atoms are preferred, 12 to 18 carbon atoms being more preferred. By "free" is meant monobasic fatty acid not adsorbed by the fine ferromagnetic oxide particles. Preferably the amount of free monobasic fatty acid in the binder is from 1.5 to 3.0% by weight of the fine ferromagnetic oxide particles. At about 4%, testing has indicated increased friction and exudation.

In preferred flexible magnetic recording media of the invention, the binder includes a lubricant-adsorption inhibitor selected from hydroxylated polycarboxylic acids of low molecular weight (i.e. having a molecular weight less than about 220, such as citric acid, tartaric acid or 1-malic acid). It preferably is used in an amount which, when adsorbed by the fine ferromagnetic oxide particles, substantially prevents monobasic fatty acid from being adsorbed by the particles. In such event, the addition of 2.0% by weight of monobasic fatty acid to the binder results in nearly 2.0% free monobasic fatty acid. Preferably, the lubricant-adsorption inhibitor is not used in an amount exceeding what can be adsorbed, because excess amounts might bleed out to contaminate the surface of the recording layer. To insure against any excess, the lubricant-adsorption inhibitor may be used in less than the adsorbable amount, thus allowing the ferromagnetic oxide particles to adsorb a portion of the monobasic fatty acid and in turn requiring the addition of a somewhat greater quantity of monobasic fatty acid than the desired free amount. Usually 2.0% of lubricant-adsorption inhibitor based on the weight of fine ferromagnetic oxide particles is completely adsorbed, but the use of much more than 2.0% might be detrimental. In the absence of a hydroxylated polycarboxylic acid, the fine ferromagnetic oxide particles adsorb monobasic fatty acid such that in a typical tape of the invention, about 2.3% monobasic fatty acid is required to result in 1.0% free monobasic fatty acid, and about 4.9% is required to result in 3.0% free content by weight.

Because the free fatty acid provides such good lubrication, coefficient of friction not exceeding 0.3 can still be attained even when the RMS surface roughness is extraordinarily low, e.g., lower than 6 nm. Such low surface roughness is more readily achieved when the ferromagnetic oxide particles are exceedingly fine, namely, have a surface area of about 40 $m^2/g$ or finer.

In addition, the inventive recording media have much improved stop motion or still framing ability in a helical scan video recorder. Stop motion is the stopping of tape motion while the rotating head or transducer scans a particular portion of the tape repeatedly to display a still image on a television screen. In stop motion, high temperatures can be generated in the recording medium and degredation of the medium can occur, resulting in the collection of debris on the head.

A hydroxylated polycarboxylic acid of low molecular weight is a preferred lubricant-adsorption inhibitor in that its use both affords surprisingly good stability to the dispersion from which the magnetic recording layer is coated, and the coatings tend to be extraordinarily smooth. These advantages have been realized when the amount of the hydroxylated polycarboxylic acid has been as low as 0.5% by weight of the ferromagnetic particles.

As in the prior art, the binder of novel flexible magnetic recording medium can include fatty acid esters, but unlike their importance in achieving the objectives of the Miyatuka patent, no fatty acid ester is necessary in the novel magnetic-recording medium, and preliminary testing suggests that there is little advantage to its use. Amounts of fatty acid ester exceeding 3% by weight of the fine ferromagnetic oxide particles have resulted in undesirably high friction.

To date, flexible media of the invention which have the highest carrier-to-noise ratios have employed the finest available ferromagnetic oxide particles, and when finer (smaller) particles become available, even higher carrier-to-noise ratios may be attainable. Preferred ferromagnetic oxides are acicular iron oxides, preferably modified with cobalt or another metal such as nickel or chromium which provides higher coercivity.

THE DRAWING

Figure 2:
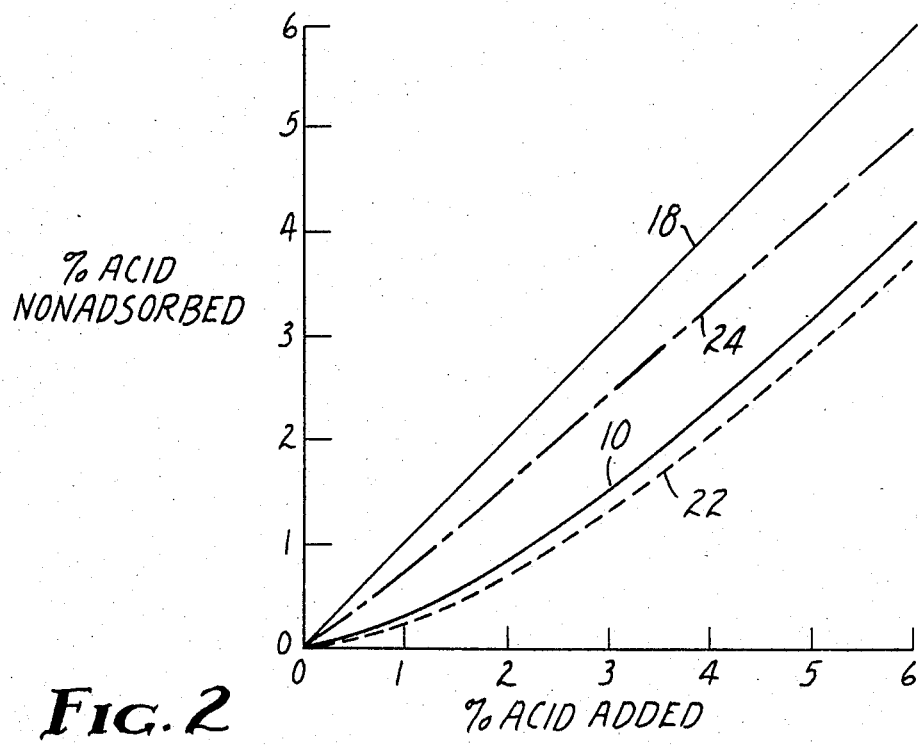

Each figure of the drawing shows the results of tests to determine the extent to which monobasic fatty acids are adsorbed by the fine ferromagnetic oxide particles of dispersions which can be used to make flexible magnetic recording media. Of these:

FIG. 1 is a graph indicating the extent to which a monobasic fatty acid, namely, myristic acid, was adsorbed by various ferromagnetic particles which are useful for making flexible magnetic recording media; and FIG. 2 is a graph indicating the extent to which various monobasic fatty acids were adsorbed by fine ferromagnetic oxide particles which are useful for making flexible magnetic recording media. In each of the graphs, the abscissa shows the weight % of monobasic fatty acid added based on the weight of the fine ferromagnetic oxide particles in the dispersion, and the ordinate shows the weight % of the monobasic fatty acid which is nonadsorbed. In FIG. 1, curve 10 shows the extent to which myristic acid was nonadsorbed by the same fine ferromagnetic oxide particles used in making the magnetic recording media of Examples 1–6 which had a surface area of about 45 m$^2$/g and an aspect ratio of 8:1. Curve 12 shows the extent to which myristic acid was adsorbed by particles having a surface area of about 29 m$^2$/g and an aspect ratio of 6:1. Curve 14 shows the extent to which myristic acid was adsorbed by acicular cobalt-doped $Fe_3O_4$ particles having a surface area of about 28 m$^2$/g and an aspect ratio of 6:1. Curve 16 shows the extent to which myristic acid was adsorbed by fine acicular metal particles having a surface area of about 43.5 m$^2$/g and an aspect ratio of 7:1. Curve 18 indicates no adsorption. The data from which curves 10, 12 and 14 were generated is reported in Table A.

TABLE A

|  | % Myristic acid | |
| --- | --- | --- |
|  | Added | Nonadsorbed |
| Curve 10 | 0.5 | 0.1 |
|  | 2.0 | 0.8 |
|  | 4.0 | 2.3 |
|  | 5.9 | 3.9 |
| Curve 12 | 1.0 | 0.9 |
|  | 2.0 | 1.8 |
|  | 2.9 | 2.8 |
|  | 4.0 | 3.9 |
|  | 5.0 | 4.7 |
| Curve 14 | 1.0 | 0.6 |
|  | 2.0 | 1.6 |
|  | 2.9 | 2.3 |
|  | 3.9 | 3.3 |
|  | 5.0 | 4.3 |
| Curve 16 | 1.1 | 0.5 |
|  | 1.9 | 1.3 |
|  | 3.0 | 2.0 |
|  | 4.0 | 2.9 |
|  | 5.0 | 3.8 |

In FIG. 2, curve 10 is identical to curve 10 of FIG. 1 and is reproduced for comparative purposes. Curves 22 and 24 show the extent to which stearic acid and isostearic acid, respectively, were adsorbed by fine ferromagnetic oxide particles identical to those used in generating curve 10. The raw data on which the curves 22 and 24 are based are reported in Table B together with data indicating that curves showing the nonadsorption of lauric acid and oleic acid would lie approximately within the area between curves 10 and 22. Curve 24 shows that isostearic acid, which has a straight chain of 8 carbon atoms, is less readily adsorbed by the fine ferromagnetic oxide particles than are monobasic fatty acids having a straight chain of at least 12 carbon atoms.

TABLE B

|  | % acid | |
| --- | --- | --- |
|  | Added | Nonadsorbed |
| Curve 22 | 1.0 | 0.2 |
| (stearic acid) | 2.0 | 0.7 |
|  | 3.0 | 1.3 |
|  | 4.0 | 2.1 |
|  | 4.9 | 2.8 |

TABLE B-continued

|  | % acid | |
| --- | --- | --- |
|  | Added | Nonadsorbed |
| Curve 24 | 1.0 | 0.7 |
| (isostearic acid) | 2.0 | 1.6 |
|  | 2.9 | 2.4 |
|  | 4.0 | 3.3 |
|  | 4.9 | 4.2 |
| (lauric acid) | 1.1 | 0.3 |
|  | 2.1 | 0.7 |
|  | 3.0 | 1.4 |
|  | 4.0 | 2.3 |
|  | 5.0 | 3.2 |
| (oleic acid) | 1.0 | 0.2 |
|  | 2.0 | 0.7 |
|  | 3.0 | 1.5 |
|  | 4.0 | 2.4 |
|  | 4.9 | 3.1 |

Test for Extend of Adsorption

To a 4-oz. (125-cm$_3$) jarcontaining 0.5 g of hexadecane as an internal standard is added a measured amount of monobasic fatty acid plus any fatty acid ester to be included in the dispersion. To this is added 100 g of a dispersion of ferromagnetic particles, organic binder material, and solvent useful for making a magnetic recording layer of a flexible magnetic recording medium (e.g., a mixture of Charges A and B of Example 1 below). The jar is then put on a paint shaker for 5 minutes followed by about 12 hours on a low speed reciprocating shaker (e.g. Eberbach two-speed shaker operating at 180 excursions per minute) and another 5 minutes on the paint shaker. About 68 g of the resulting dispersion are transferred to a centrifuge tube and centrifuged for 10 minutes at 17,000 rpm. The supernatant is decanted, diluted 4:1 with methyl ethyl ketone, and analyzed by gas/liquid chromatography (GLPC) for the quantity of monobasic fatty acid. The chromatograph was fitted with a Supelco glass column three feet (914 mm) long and 2 mm diameter, packed with GP 5% DEGS-PS on 100/120 mesh (150/125 micrometers) Supelcoport support. This provides a close approximation to the proportion of free monobasic fatty acid which would not be adsorbed by the fine ferromagnetic oxide particles if the particles and fatty acid were dispersed with a binder to provide a flexible magnetic recording medium. When a fatty acid ester is included in this test, it substantially is nonadsorbed by the particles, showing that it remains free when included in a tape-making binder. This test also can show the extent to which a lubricant-adsorption inhibitor is adsorbed by fine ferromagnetic oxide particles. For purposes of chromatographic analysis, the hydroxylated polycarboxylic acids were methylated with diazo methane in diethyl ether.

Test for Coefficient of Friction

Static coefficient of friction has been tested by a technique similar to that described in the draft "Measuring Methods for video Tape Properties" Specification 60B (Central Office) 44 of the International Electrotechnical Commission. A recording medium tape sample is transported over a very smooth stainless steel pin of 3.2 mm diameter at a constant speed of 33.3 mm/sec. Tape tension is measured (e.g. by tensiometers) before and after the tape traverses over the stainless steel pin at a specified angle of wrap, and coefficient of friction is calculated from the tension data.

In the following examples, all parts are by weight.

EXAMPLE 1

A flexible magnetic recording medium of the invention was made as follows:

| | Parts |
|---|---|
| Charge A | |
| methyl ethyl ketone | 42.2 |
| toluol | 15.0 |
| cyclohexanone | 15.0 |
| dispersing agent | 6.0 |
| acicular cobalt-doped gamma $Fe_2O_3$, about 0.25 micrometer length, aspect ratio about 8 to 1, surface area 45 $m^2/g$. | 100.0 |
| Charge B | |
| organic binder material (high-molecular-weight polyester-polyurethane polymer synthesized from neopentyl glycol and poly-epsilon caprolactone diol) | 10.9 |
| copolymer of vinyl chloride, vinyl acetate and vinyl alcohol (Union Carbide "VAGH") | 3.6 |
| methyl ethyl ketone | 37.2 |
| toluol | 13.2 |
| cyclohexanone | 13.2 |
| Charge C | |
| butyl myristate | 1.17 |
| myristic acid | 3.5 |
| head-cleaning agent ($Al_2O_3$) | 2.35 |
| diphenylmethane diisocyanate ("Mondur" CB-75) | 6.6 |
| carrier solvent for the diisocyanate | 2.2 |

Charges A and B were consecutively stirred with a blade mixer unitl homogenous and then charged to a sandmill and milled until there were visible particle aggregates Charge C was slowly added while the dispersion was stirred with the blade mixer, followed by vigorous mixing for about 15 minutes. The mixture, having a free myristic acid content of 1.8%, was then rotogravure-coated onto a biaxially-oriented poly(ethylene terephthalate) film 0.014 mm in thickness. After heating to drive off the volatile vehicle and cure the polymer, the magnetizable coating was supercalendered to provide a flexible magnetic recording medium having an RMS surface roughness of 5.9 nm.

This medium was slit to a width of ½ inch (1.27 cm) to provide a video tape, the video carrier-to-noise ratio (54.2 dB) of which was as high as that of a metal particle reference tape.

EXAMPLE 2

A magnetic recording tape was made as in Example 1 except that Charge C was replaced by the following two charges:

| | Parts |
|---|---|
| Charge D | |
| citric acid | 2.0 |
| methyl ethyl ketone used to pre-dissolve the citric acid | 8.0 |
| Charge E | |
| head-cleaning agent ($Al_2O_3$) | 2.35 |
| diphenyl methane diisocyanate ("Mondur" CB-75) | 6.7 |
| carrier solvent for the diisocyanate | 2.2 |
| myristic acid | 2.0 |

Charge D was added to the dispersion of Charges A and B with rigorous mixing for 15 minutes using the blade mixer, and this was then allowed to stand overnight to equilibrate. Immediately before coating, Charge E was slowly added while the dispersion was stirred with the blade mixer, followed by rigorous mixing for about 15 minutes. The mixture, having about 2% free myristic acid, was then rotogravure-coated onto a biaxially-oriented poly(ethylene terephthalate) film 0.014 mm in thickness. After heating to drive off the volatile vehicle and cure the polymer, the magnetizable coating was supercalendered to provide a flexible magnetic recording medium having an RMS surface roughness of 5.2 nm.

COMPARATIVE EXAMPLE A

A flexible magnetic recording medium was made as in Example 2 except omitting Charge D. The RMS surface roughness of its magnetizable surface was 6.1 nm. The myristic acid content of the magnetizable coating (as determined by the above "Test for Extent of Adsorption") was about 0.8% based on the ferromagnetic oxide particles.

EXAMPLES 3-6 AND COMPARATIVE EXAMPLE B

Additional flexible magnetic recording media were made as described in Example 1 except that in making the media of Example 3 and 6, the butyl myristate was omitted, and in making some media the myristic acid was replaced by another monobasic fatty acid. The fatty acids used were as follows:

| | Parts |
|---|---|
| Example 3: myristic acid | 3.5 |
| Example 4: stearic acid | 3.8 |
| Example 5: lauric acid | 3.6 |
| Example 6: oleic acid | 3.5 |
| Comp. Ex. B: isostearic acid | 2.35 |

TESTING

Each of the flexible media of Examples 1-6 and Comparative Examples A and B were subjected to the above-described "Test for Coefficient of Friction". The results were

| Example | Coefficient of Friction |
|---|---|
| 1 | 0.15 |
| 2 | 0.18 |
| 3 | 0.15 |
| 4 | 0.20 |
| 5 | 0.21 |
| 6 | 0.30 |
| Comp. A | 0.44 |
| Comp. B | 0.71 |

Each medium of Examples 1-6 performed well as a videotape in a VHS home video recorder.

We claim:

1. Flexible magnetic recording medium comprising a magnetic recording layer having an RMS surface roughness not exceeding 9 nanometers (nm) and comprising a binder in which are dispersed ferromagnetic oxide particles having a surface area of at least 40 m$^2$/g, said binder containing free monobasic fatty acid in an amount exceeding 1.5 percent by weight of the ferromagnetic oxide particles, but less than an amount that would exude from the recording layer, which fatty acid has a straight chain of at least 12 carbon atoms and provides a coefficient of friction not exceeding 0.3.

2. Magnetic recording medium as defined in claim 1, the ferromagnetic oxide particles of which have a surface area of at least 45 m$^2$/g.

3. Magnetic recording medium as defined in claim 2 and having an RMS surface roughness of less than 6 nm.

4. Magnetic recording medium as defined in claim 1 wherein the amount of free monobasic fatty acid is from 1.5 to 3.0% by weight of the ferromagnetic oxide particles.

5. Magnetic recording medium as defined in claim 4 wherein the free monobasic fatty acid comprises myristic acid.

6. Magnetic recording medium as defined in claim 4 wherein the free monobasic fatty acid comprises lauric acid.

7. Magnetic recording medium as defined in claim 4 wherein the free monobasic fatty acid comprises stearic acid.

8. Magnetic recording medium as defined in claim 4 wherein the free monobasic fatty acid comprises oleic acid.

9. Magnetic recording medium as defined in claim 1 wherein the binder includes a lubricant-adsorption inhibitor selected from hydroxylated polycarboxylic acids having a molecular weight less than about 220 in an amount comprising at least 0.5% by weight of the ferromagnetic oxide particles.

10. Magnetic recording medium as defined in claim 9 wherein the lubricant-adsorption inhibitor is present in an amount which substantially prevents the free monobasic fatty acid from being adsorbed by the oxide particles.

11. Magnetic recording medium as defined in claim 10 wherein the lubricant-adsorption inhibitor is citric acid.

12. Magnetic recording medium as defined in claim 1 wherein the binder includes fatty acid ester in an amount not more than 3% by weight of the ferromagnetic oxide particles.

13. Magnetic recording medium as defined in claim 1 which is a video tape.

14. A flexible magnetic recording medium comprising a magnetic recording layer having an RMS surface roughness not exceeding 9 nanometers and comprising a binder in which are dispersed ferromagnetic oxide particles having a surface area of at least 40 m$^2$/g, said binder containing free monobasic fatty acid in an amount between 1.5 and 4 percent by weight of the ferromagnetic oxide particles, which fatty acid has a straight chain of at least 12 carbon atoms.

15. The magnetic recording medium of claim 14 wherein the binder contains a lubricant-adsorption inhibitor selected from hydroxylated polycarboxylic acids, having a molecular weight of less than about 220, in an amount of from 0.5 to about 2 weight percent of the ferromagnetic particles.

16. The magnetic recording medium of claim 14 wherein the ferromagnetic particles comprise at least 74 weight percent of total particles and binder.

* * * * *

UNITED STATES PATENT AND TRADEMARK OFFICE
CERTIFICATE OF CORRECTION

PATENT NO. : 4,693,930

DATED : September 15, 1987

INVENTOR(S) : MACKAY, et al

It is certified that error appears in the above-identified patent and that said Letters Patent is hereby corrected as shown below:

Column 1, line 14, "(which may be flexible backing" should be
--(which may have a flexible backing)--.

Column 6, line 19, "Test for Extend of Adsorption" should be
--Test for Extent of Adsorption--.

Column 6, line 21, "jarcontaining" should be
--jar containing-
Column 6, line 60, "video" should be -- Video --.
Column 7, line 38, "were visible particle" should be -- were no visible particle --.

Signed and Sealed this

Twenty-eighth Day of February, 1989

Attest:

DONALD J. QUIGG

Attesting Officer     Commissioner of Patents and Trademarks